United States Patent
Nagata

(10) Patent No.: US 10,474,130 B2
(45) Date of Patent: Nov. 12, 2019

(54) MACHINING SIMULATION DEVICE

(71) Applicant: FANUC Corporation, Yamanashi (JP)

(72) Inventor: Daisuke Nagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 353 days.

(21) Appl. No.: 14/823,439

(22) Filed: Aug. 11, 2015

(65) Prior Publication Data

US 2016/0048616 A1 Feb. 18, 2016

(30) Foreign Application Priority Data

Aug. 12, 2014 (JP) .................... 2014-164233

(51) Int. Cl.
*G05B 19/4069* (2006.01)

(52) U.S. Cl.
CPC ............ *G05B 19/4069* (2013.01); *G05B 2219/32356* (2013.01); *Y02P 90/26* (2015.11)

(58) Field of Classification Search
CPC .. G06F 17/5009; G06F 17/50; G06F 17/5086; B29C 33/3835; B29C 70/48; G05B 19/41885; G05B 19/4069; G05B 2219/32356; Y02P 90/26
USPC .......................................................... 703/7
See application file for complete search history.

(56) References Cited

U.S. PATENT DOCUMENTS

| | | | | |
|---|---|---|---|---|
| 4,521,860 A | * | 6/1985 | Kanematsu | G05B 19/40937 700/172 |
| 5,815,400 A | * | 9/1998 | Hirai | G05B 19/401 700/173 |
| 6,505,092 B1 | * | 1/2003 | Fukaya | G05B 19/4068 700/179 |
| 6,662,073 B1 | | 12/2003 | Fujishima et al. | |
| 6,885,984 B1 | | 4/2005 | Suzuki et al. | |
| 2010/0204818 A1 | | 8/2010 | Yamada et al. | |
| 2013/0268110 A1 | * | 10/2013 | Hamada | G05B 19/404 700/192 |
| 2014/0288887 A1 | * | 9/2014 | Ooishi | G06F 17/50 703/1 |

FOREIGN PATENT DOCUMENTS

| | | |
|---|---|---|
| CN | 1215358 A | 4/1999 |
| CN | 101489718 A | 7/2009 |

(Continued)

OTHER PUBLICATIONS

Office Action in JP Application No. 2014-164233,5, dated Jul. 2016.

(Continued)

*Primary Examiner* — Kamini S Shah
*Assistant Examiner* — John E Johansen
(74) *Attorney, Agent, or Firm* — Hauptman Ham, LLP

(57) ABSTRACT

A machining simulation device includes a cutting condition extraction unit, a tool type determine unit, a load calculation unit configured to calculate a spindle load, a load determination unit configured to determine whether the calculated spindle load is within a predetermined maximum load, an adjustment amount calculation unit configured to calculate an adjustment amount of the cutting condition when the calculated spindle load is determined not to be within the predetermined maximum load, and a display unit configured to display a result of the determination.

3 Claims, 5 Drawing Sheets

(56) References Cited

FOREIGN PATENT DOCUMENTS

| | | | |
|---|---|---|---|
| EP | 0945771 A2 * | 9/1999 | ......... G05B 19/4068 |
| EP | 0945771 A2 * | 9/1999 | ......... G05B 19/4068 |
| JP | 62-228353 A | 10/1987 | |
| JP | H06-270034 A | 9/1994 | |
| JP | 11-277371 A | 10/1999 | |
| JP | 2006-263904 A | 10/2006 | |
| JP | 2008-217744 A | 9/2008 | |
| JP | 2009-12092 A | 1/2009 | |
| JP | 2009-53823 A | 3/2009 | |
| JP | 2010-262474 A | 11/2010 | |
| WO | 02/003155 A1 | 1/2002 | |

OTHER PUBLICATIONS

Office Action in JP Application No. 2014-164233, dated Nov. 8, 2016.
Office Action in CN Application No. 201510494174.2, dated Oct. 9, 2017; 12 pages.
Office Action in DE Application No. 102015112831.4 dated May 23, 2019, 11pp. (partial translation).
"Cutting machines tools for machining with geometrically determined cutting edge", lecture notes of Prof. Dr. h.c. Ing. Eckhart Uhlmann, pp. 1-38, WS 2008/09-Machining system machine tool-VL3, Technische Universitat Berlin, Germany, 40pp. (partial translation).

* cited by examiner

MACHINING SIMULATION DEVICE

RELATED APPLICATIONS

The present application claims priority to Japanese Application Number 2014-164233, filed Aug. 12, 2014, the disclosure of which is hereby incorporated by reference herein in its entirety.

BACKGROUND OF THE INVENTION

1. Field of the Invention

The present invention relates to a machining simulation device, particularly relates to a machining simulation device enabling appropriate evaluation of the cutting condition.

2. Description of the Related Art

Machining by a machining tool requires data which needs to be set in the control device before machining, in addition to a machining program. The data includes origin position for a program as a setup data, which is the reference position of a workpiece, and tool information including a tool length and a tool configuration, while the machining program specifies a spindle rotation speed, a feed speed, whether to use a coolant or not, a cutting amount, and the like.

There is a method to determine whether a cutting condition in the machining program is appropriate or not before the machining based on the machining program. In the method, a machining load is detected in trial machining to determine whether a cutting condition in the machining program is appropriate or not (For example, Japanese Patent Application Laid-Open No. 6-270034, Japanese Patent Application Laid-Open No. 2010-262474). There is also a method to determine whether a cutting condition in the machining program is appropriate or not without actual machining. In the method, machining simulation is executed with the machining condition to determine whether a cutting condition in the machining program is appropriate or not (For example, Japanese Patent Application Laid-Open No. 2008-217744).

However, in the techniques described in Japanese Patent Application Laid-Open No. 6-270034, Japanese Patent Application Laid-Open No. 2010-262474, it is necessary to actually perform the machining to determine whether a cutting condition is appropriate or not, so there is a problem that the machining tool might get out of order when the machining condition is not appropriate. In the technique described in Japanese Patent Application Laid-Open No. 2008-217744, there is no possibility that the machining tool gets out of order since the determination is performed without the actual machining, but there is a possibility that the cutting condition is evaluated base on wrong data (i.e. a data different from the data used in the machining program) since all machining conditions need to be input and simulated for the determination and there is a possibility that a wrong data, different from the data actually used in the machining program, is input especially when data to be input is increased to determine that more than one machining conditions are appropriate or not at the same time.

SUMMARY OF THE INVENTION

Therefore, the object of the invention is to provide a machining simulation device having a function of extracting a large part of data, which is necessary for the cutting condition evaluation.

A machining simulation device for performing machining simulating based on a setup data including a workpiece position data and a tool data, a workpiece data including a data of a workpiece type and configuration data, and a machining program according to the present invention, includes a cutting condition extraction unit configured to extract a cutting condition in machining based on the machining program, from the machining program, a tool type determine unit configured to determine a tool type of a tool to be used in the machining program, a load calculation unit configured to calculate a spindle load in the machining based on the extracted cutting conditions and the determined tool type, a load determination unit configured to determine whether the spindle load calculated by the load calculation unit exceeds a predetermined threshold or not, an adjustment amount calculation unit configured to calculate an adjustment amount of the cutting condition corresponding to the determined tool type such that the spindle load is equal to or less than the threshold when the calculated spindle load is determined to exceed the threshold, and a display unit configured to display a result of the determination by the load determination unit and an adjustment guidance generated based on the adjustment amount.

The tool type determination unit may determine the tool type based on a program code of the machining program.

The tool type determination unit may analyze the machining program, obtain a cutting direction of a tool and a spindle direction, and determine that the tool is a drill type tool or a thread type tool when the cutting direction of the tool coincides with the spindle direction, and determine that the tool is an end mill type tool when the cutting direction of the tool does not coincide with the spindle direction.

The adjustment amount may be a change amount of a feed amount and a prepared hole diameter when the tool type is a drill type tool, the adjustment amount may be a change amount of a feed amount and a cutting width and a cutting depth when the tool type is an end mill type tool, and the adjustment amount may be a change amount of a prepared hole diameter when the tool type is a tapping tool.

The present invention with the above mentioned configuration can directly extract the cutting condition from the machining program and appropriately determine the cutting condition without actual machining, so that input errors of data necessary for the determination are reduced. In addition to that, engineer, who can not discriminate the tool type, can easily determine whether or not the machining can be performed with the set cutting condition.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
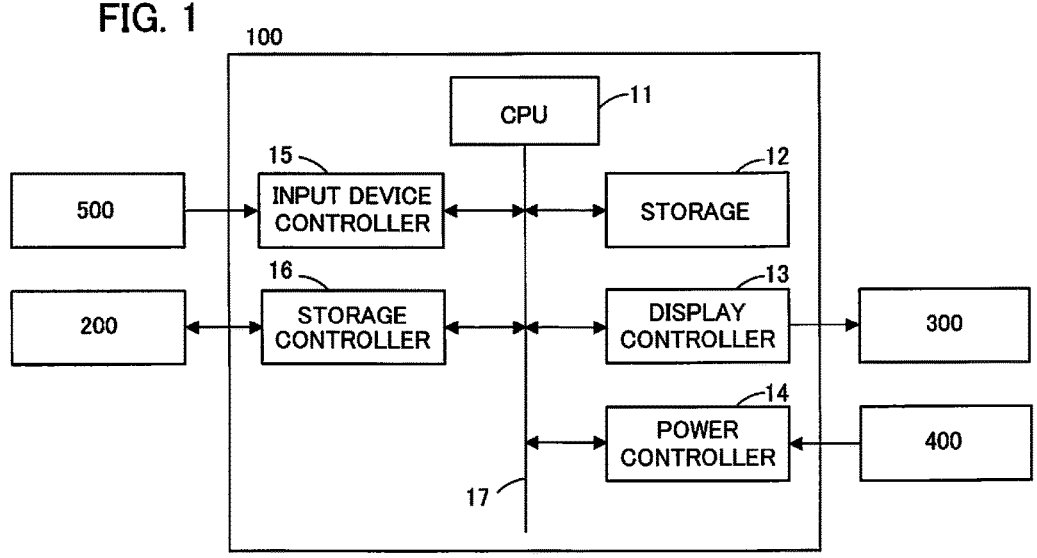
FIG. 1 is a block diagram of relevant parts of a machining simulation device of one embodiment of the present invention.

The present embodiment relates to a machining simulation device having a function of determining whether a cutting condition in the machining program is appropriate or not. The machining simulation device in the present embodiment comprises a processing unit such as a computer. FIG. 1 is a block diagram of relevant parts of the machining simulation device 100 of the present embodiment. In the machining processing unit 100, CPU 11, a storage 12, a display controller 13, a power controller 14, an input device controller 15, and a storage controller 16 are connected via a bus 17. CPU 11 performs a calculation processing. The storage 12 includes RAM or ROM. The display controller 13 controls a display 300. The power unit performs on/off control of power supply of the machining simulation device 100, based on the on/off signal from a power switch 400. The input device controller 15 controls an external input device 500. The storage controller 16 controls a storage unit 200.

A storage 12 is a storage device which stores various data input from the outside using a storage unit 200, an external input device 500 or the like, and stores a system program and the like. The external input device 500 includes a keyboard or a mouse. The input device controller 15 sends the input data from the external input device 500 to the machining simulation device 100. The storage controller 16 controls inputting and outputting of data with the storage unit 200.

A machining program to be simulated in machining simulation, a setup data, and workpiece information are stored in the storage unit 200, and read by the machining simulation device 100 via the storage controller 16 to be used by the machining simulation device 100.

Figure 2:
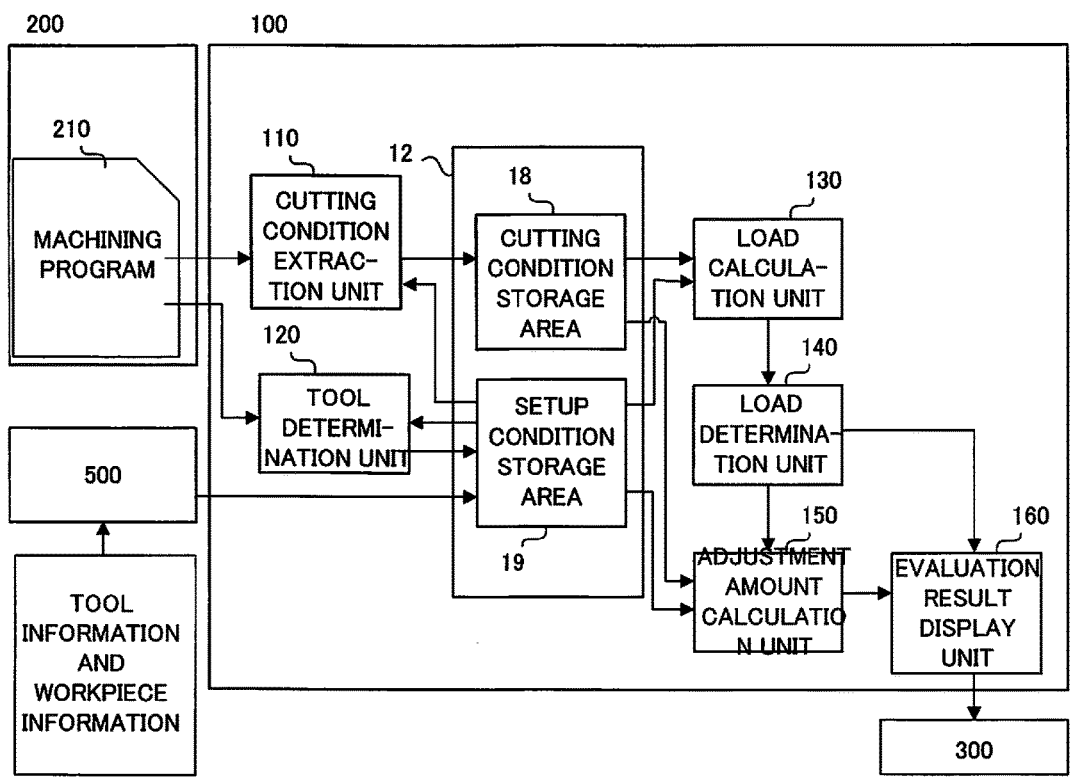
FIG. 2 is a functional block diagram of a machining simulation device of one embodiment of the present invention.

FIG. 2 is a functional block diagram of the machining simulation device 100 of one embodiment of the present invention. The machining simulation device 100 includes a cutting condition extraction unit 110, a tool determination unit 120, a load calculation unit 130, a load determination unit 140, an adjustment amount calculation unit 150, and an evaluation result display unit 160.

The storage unit 200, connected to the machining simulation device 100, stores a machining program 210 to be simulated in machining simulation, in advance. The storage 12 installed in the machining simulation device 100 includes a cutting condition storage area 18 and a setup information storage area 19. The cutting condition storage area 18 stores cutting conditions of tools to be used in machining, while the setup information storage area 19 stores a setup data including workpiece reference position and tool information, and workpiece information including a workpiece type and workpiece configuration. The setup data and the workpiece information are input to the setup information storage area 19 via the external input device 500 or the like, and stored in the area. Concerning the machining program, the setup data, and the workpiece information, a data actually input to a control device for controlling a machining tool may be obtained via a storage media, a network, or the like. This configuration eliminates input error of the data to the machining simulation device 100.

The cutting condition extraction unit 110 performs machining simulation based on the machining program 210 and the data stored in the setup information storage area 19, to the cutting condition including extract rotation speed, feed velocity, cutting amount and the like in each machining step using each tool used in the machining program 210 and stores the cutting condition data in the cutting condition storage area 18 in the storage 12.

For data stored in the setup information storage area in which tool type is not determined, the tool determination unit 120 performs machining simulation based on the machining program 210 and the data stored in the setup information storage area 19, determines the tool type of the tool, and stores the tool type data in the setup information storage area 19 as a tool information. The tool type includes a drill type tool, an end mill type tool, a tapping type tool or the like. The tool determination unit 120 simulates movement of each tool at a cutting feed speed in machining simulation. The tool determination unit 120 determines that the tool is a drill type tool when the movement of the tool is along an axis parallel to a spindle, determines that the tool is an end mill type tool when the tool including other movement than along an axis parallel to the spindle, and determines that the tool is a tapping type tool when command for threading only, as the G33 of the G code, is issued in the machining program to the tool. Here, the drill type tool includes a drill, a reamer, and a boring, while the end mill type tool includes an end mill, a milling.

When machining by the drill type tool is performed in the same position before machining of the tool, the tool determination unit 120 considers the machining to be a prepared hole processing and stores the diameter of the prepared hole in the cutting condition storage area 18, for the tool determined to be the drill type tool or the tapping type tool.

The load calculation unit 130 read the cutting condition in each machining step of each tool stored in the cutting condition storage area 18, and the setup data and workpiece information stored in the setup information storage area 19. Then, the load calculation unit 130 performs a load calculation process, and calculate a load (a torque) on the machining tool in machining operation using the each tool.

The load determination unit 140 determines the load calculated by the load calculation unit 130 exceeds the maximum load allowed for the machining tool, and outputs a determination result of "OK" when the load is not larger than the maximum load, and outputs a determination result of "NG" when the load exceeds the maximum load. The maximum load may be stored in the storage unit 200 or the storage 12, or may be obtained from the control device or the machining tool.

The adjustment amount calculation unit 150 adjusts the cutting condition in an adjustment amount calculation process described later, and outputs the adjustment amount, for machining of the tool which got the determination result of "NG" by the load determination unit 140.

The evaluation result display unit displays the determination result output from the load determination unit 140 and an adjustment guidance generated based on the adjustment amount output from the adjustment amount calculation unit 150, using the display 300. Here the adjustment guidance is such a guidance that promotes an operator to adjust the cutting condition of cutting operation based on the adjustment amount output from the adjustment amount calculation unit 150, and the adjustment guidance is generated using guidance phrases stored in the storage unit 200 in advance and based on the adjustment amount output from the adjustment amount calculation unit 150.

Next, the load calculation process executed in the load calculation unit 130 of the machining simulation device 100 in one embodiment of the present invention.

In the load calculation process, the cutting conditions of machining by each tool stored in the cutting condition storage area 18 and the setup data and the workpiece information stored in the setup information storage area 19 are read, then a load on the spindle which supports the load in machining is calculated using calculation formulas prepared for tool types of each tool used in machining.

When the tool type is the drill type, the cutting condition for machining stored in the cutting condition storage area 18 and the setup data and the workpiece information stored in the setup information storage area 19 are read, then the torque applied to the tool (the spindle) in machining is calculated using the following formula (1).

$$T=0.0317 \times H_B \times f^{0.8} \times (D-d)^{1.8} \times 9.8/100$$

$$\text{Here,} f=F/S \tag{1}$$

In the formula (1), T denotes a cutting torque with the unit [Nm], and $H_B$ denotes a Brinell hardness for each workpiece. f denotes a feed amount in each rotation of the tool, and obtained using a cutting feed speed F (with the unit [mm/min]) and a spindle speed S (with the unit [min$^{-1}$]), and the unit of f is [mm/rev]. D denotes a diameter of the tool with the unit [mm], and d denotes the prepared radius with the unit [mm].

When the tool type is a end mill type, the cutting condition for machining stored in the cutting condition storage area 18 and the setup data and the workpiece information stored in the setup information storage area 19 are read, then the torque applied to the spindle supporting the tool in machining is calculated using the following formula (2).

$$T=b \times V^1 \times 9.8/100$$

$$\text{Here,} f=F/S, V=Ad \times Rd \times f \tag{2}$$

In the formula (2), T denotes a cutting torque with the unit [Nm], f denotes a feed amount in each rotation of the tool with the unit [mm/rev], Rd denotes a cutting width in the radius direction with the unit [mm], and V denotes a cutting volume of the tool with the unit [mm$^3$/rev/tooth]. b and q is a constant determined by a cutting force of the workpiece.

When the tool type is the tapping type, the cutting condition for machining stored in the cutting condition storage area 18 and the setup data and the workpiece information stored in the setup information storage area 19 are read, then the torque applied to the spindle in machining is calculated using the following formula (3).

$$T=\tan \theta \times (D-d)^2 \times (D+2d) \times K \times k/24000 \times 9.8 \tag{3}$$

In the formula (3), T denotes a cutting torque with the unit [Nm], θ denotes a half angle of the thread and usually equal to 30 degree, D denotes a diameter of the tool with the unit [mm], d denotes the prepared radius with the unit [mm], K denotes a specific cutting force determined by the workpiece type and with the unit [kgf/mm$^2$], k denotes a configuration correction coefficient determined by the configuration of the tap.

The coefficients in the formulas are stored in the storage unit or the storage 12 in advance.

Next, the adjustment amount calculation process executed in the adjustment amount calculation unit 150 of the machining simulation device 100 of the present embodiment will be described. When the determination result by the load determination unit 140 is "NG", the adjustment amount calculation unit determines which cutting condition to be adjusted in the cutting conditions in the machining, and calculates the adjustment amount, to out put the result.

When the tool type is a drill type, the load of the machining tool is adjusted by the following two adjustment methods.

<I. Method to Adjust the Feed Amount "f" in Each Rotation of the Tool>

In the present method, the feed amount "f" in each rotation of the tool is changed to adjust a load applied to the spindle. The feed amount "f" in each rotation of the tool is calculated by the following formula (4).

$$\beta^{0.8}=\alpha$$

$$\text{Here,} T=_{max}=\alpha \times T \tag{4}$$

In the formula (4), ß denotes a rate with which the cutting condition to be adjusted is changed. $T_{max}$ denotes the maximum load allowed for the machining tool, and T is a load calculated by the load calculation unit 130.

The feed amount "f" in each rotation of the tool, to be designated by a block or the like of the machining program corresponding to the machining operation, is adjusted using ß calculated by the formula, to adjust the load applied to the spindle to be within the maximum load.

<II. Method to Adjust the Radius "d" of the Prepared Hole>

In the present method, the radius "d" of the prepared hole is changed to adjust a load applied to the spindle. The adjustment amount of the radius "d" of the prepared hole is calculated by the formula (1), such that the torque T is within the maximum torque $T_{max}$. More specifically, the diameter d of the prepared hole is increased by 0.1, and the value of d is determined as the adjustment amount when the relation of the maximum load $T_{max} \geq T$ is satisfied.

When the tool type is an end mill type, the load of the machining tool is adjusted by the following three adjustment methods.

<I. Method to Adjust the Feed Amount "f" in Each Rotation of the Tool>

In the present method, the feed amount "f" in each rotation of the tool is changed to adjust a load applied to the spindle. The feed amount "f" in each rotation of the tool is calculated by the following formula (5).

$$\beta^q=\alpha$$

$$\text{Here,} T_{max}=\alpha \times T \tag{4}$$

In the formula (5), ß denotes a rate with which the cutting condition to be adjusted is changed. q denotes a constant determined by the cutting force of the workpiece, $T_{max}$ denotes the maximum load allowed for the machining tool, and T is a load calculated by the load calculation unit 130. The feed amount "f" in each rotation of the tool, to be designated by a block or the like of the machining program corresponding to the machining operation, is adjusted using ß calculated by the formula, to adjust the load applied to the spindle to be within the maximum load.

<II. Method to Adjust the Cutting Width "Rd" in the Radius Direction>

In the present method, the cutting width "Rd" in the radius direction in the cutting condition is changed to adjust a load applied to the spindle. The rate ß with which the cutting width Rd in the radius direction is changed is calculated by the formula (5). The cutting width "Rd" in the radius direction, to be designated by a block or the like of the machining program corresponding to the machining operation, is adjusted using ß calculated by the formula, to adjust the load applied to the spindle to be within the maximum load.

<III. Method to Adjust the Cutting Depth "Ad" in the Axial Direction>

In the present method, the cutting depth "Ad" in the axial direction in the cutting condition is changed to adjust a load applied to the spindle. The rate ß with which the cutting depth Ad in the axial direction is changed is calculated by the formula (5). The cutting depth "Ad" in the axial direction, to be designated by a block or the like of the machining program corresponding to the machining operation, is adjusted using ß calculated by the formula, to adjust the load applied to the spindle to be within the maximum load.

When the tool type is a tapping type, the load of the machining tool is adjusted by the following method.

<I. Method to Adjust the Radius "d" of the Prepared Hole>

In the present method, the radius "d" of the prepared hole is changed to adjust a load applied to the spindle. The adjustment amount of the radius "d" of the prepared hole is calculated by the formula (3), such that the torque T is within the maximum torque $T_{max}$. More specifically, the diameter d of the prepared hole in the formula (1) is increased by 0.1, and the value of d is determined as the adjustment amount when the relation of the maximum load $T_{max} \geq T$ is satisfied.

Figure 3:
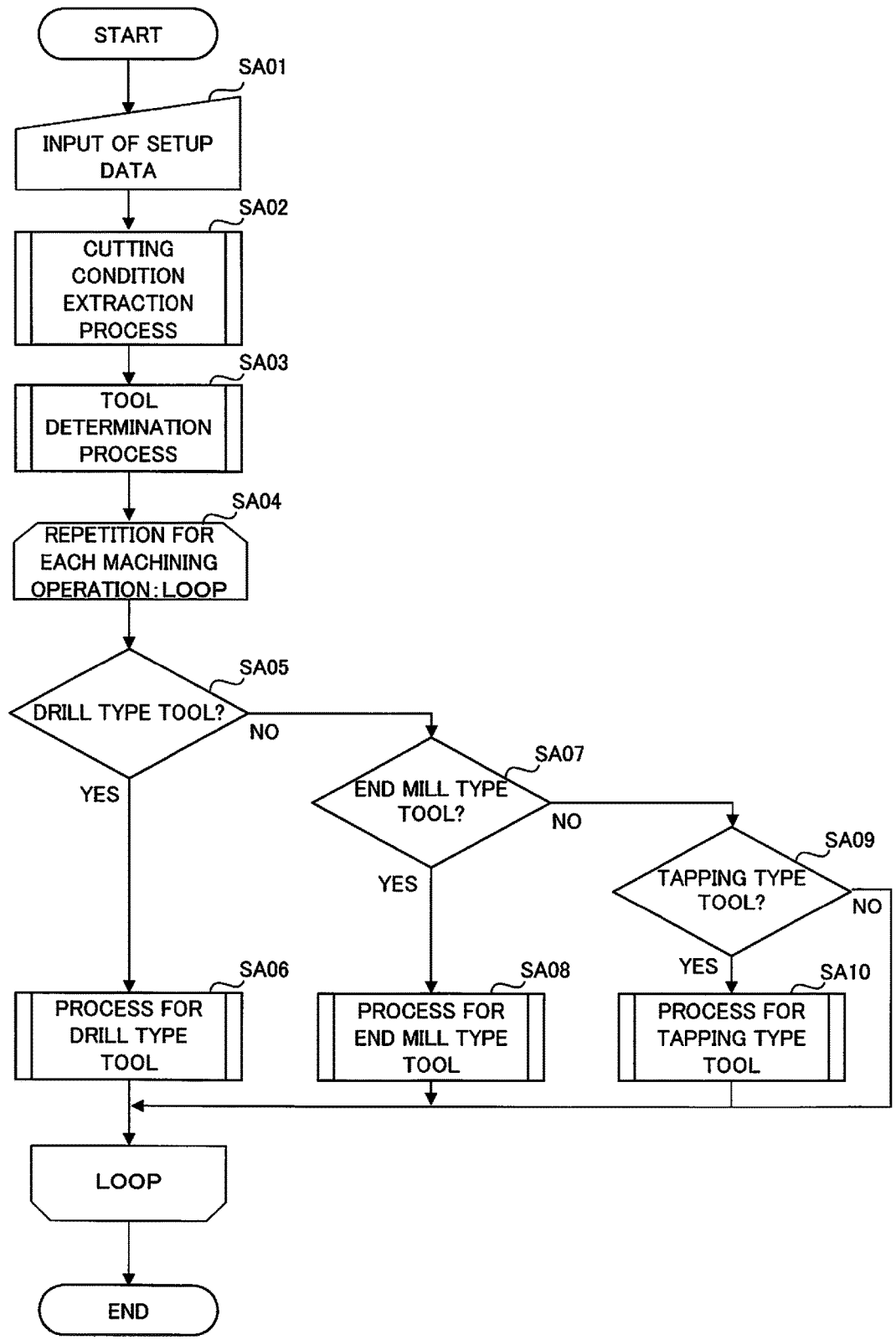
FIG. 3 is a flowchart showing an entire flow of machining simulation process of one embodiment of the present invention.

FIG. 3 is a flowchart showing an entire flow of machining simulation process executed by a machining simulation device.

(Step SA01) The tool information including the tool type, length and configuration of the tool, the workpiece information including the workpiece type, configuration and reference position of the workpiece, and the like is input as the setup data and stored in the setup information storage area 19 of the storage 12.

(Step SA02) Machining simulation is executed using the machining program 210 read out from the storage unit 200 and based on the set up date read out from the setup information storage area, the cutting condition is extracted and stored in the cutting condition storage area 18 of the storage 12. The cutting condition includes spindle rotation speed, feed speed, whether or not coolant is used, and cutting amount of cutting width and cutting depth, and the like.

(Step SA03) For data stored in the setup information storage area in which tool type is not determined, the tool determination unit 120 performs machining simulation based on the machining program 210 and the data stored in the setup information storage area 19, determines the tool type of the tool, and stores the tool type data in the setup information storage area 19 as a tool information.

(Step SA04) Steps SA05 to SA10 are repeated for each machining operation commanded by each block of the machining program.

(Step SA05) Whether the tool used in the commanded machining operation is a drill type tool or not is determined. If the tool is a drill type tool, the process proceeds to step SA06, and otherwise proceeds to step SA07.

(Step SA06) The load calculation process, the load determination process, and the adjustment amount calculation process for a drill type tool is executed.

(Step SA07) Whether the tool used in the commanded machining operation is an end mill type tool or not is determined. If the tool is an end mill type tool, the process proceeds to step SA08, and otherwise proceeds to step SA09.

(Step SA08) The load calculation process, the load determination process, and the adjustment amount calculation process for an end mill type tool is executed.

(Step SA09) Whether the tool used in the commanded machining operation is a tapping type tool or not is determined. If the tool is a tapping type tool, the process proceeds to step SA10, and otherwise proceeds to step SA09.

(Step SA10) The load calculation process, the load determination process, and the adjustment amount calculation process for a tapping type tool is executed.

Figure 4:
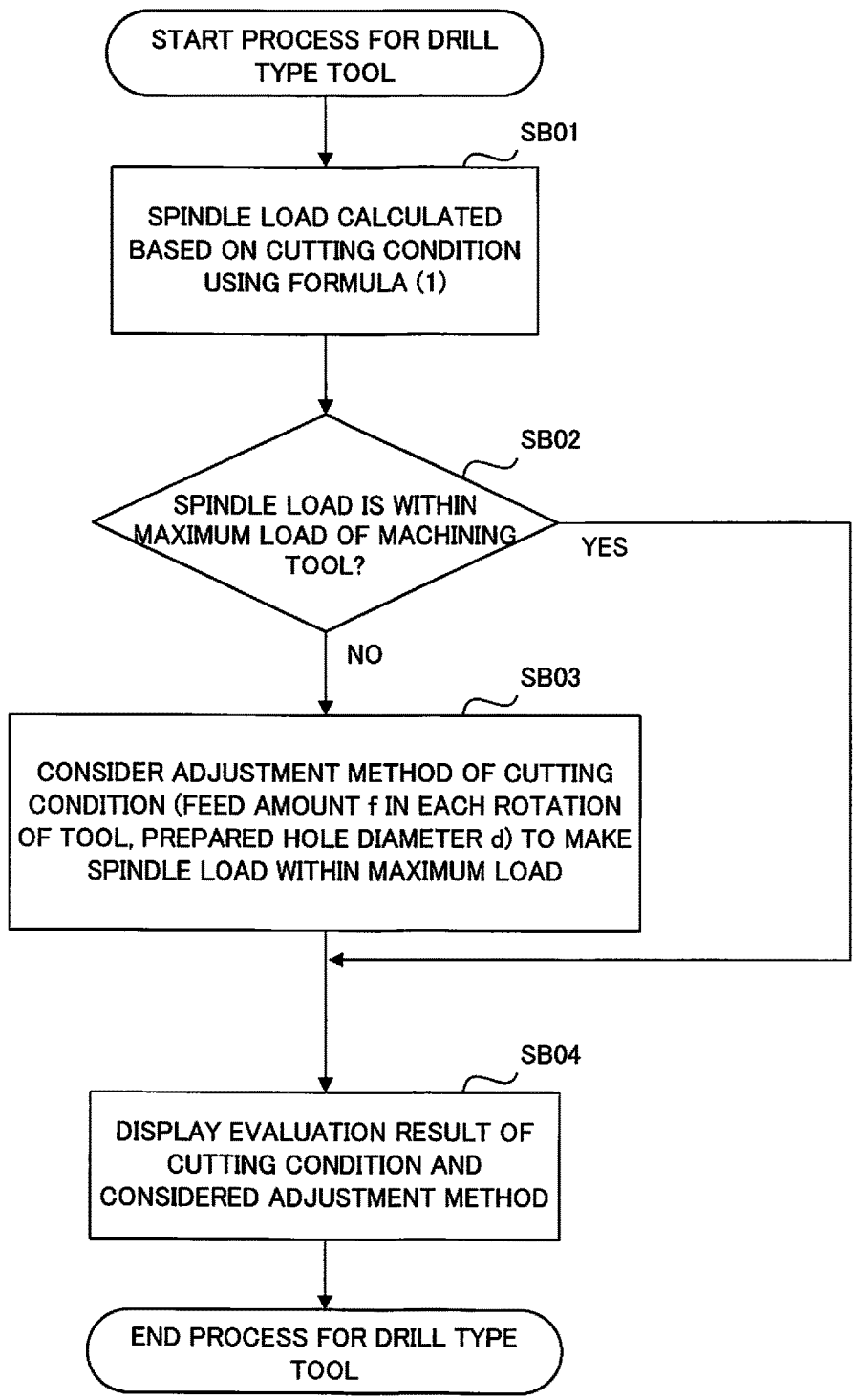
FIG. 4 is a flowchart showing a process for a drill type tool of one embodiment of the present invention.

FIG. 4 is a flowchart showing a flow of the load calculation process, the load determination process, and the adjustment amount calculation process for the drill type tool, executed by the machining simulation device 100.

(Step SB01) The load calculation unit 130 calculates the load applied to the spindle by the formula (1), based on the cutting condition read out from the cutting condition storage area 18 and the setup data read out from the setup information storage area 19.

(Step SB02) The load determination unit 140 determines the load applied to the spindle calculated by the load calculation unit 130 in step SB01 is within the maximum load or not. If the load is within the maximum load, the process proceeds to step SB04, and if the load exceeds the maximum load, the process proceeds to step SB03.

(Step SB03) The adjustment amount calculation unit 150 calculates the adjustment amount with which the feed amount f of the feed amount "f" in each rotation of the tool or the diameter of the prepared hole "d" is adjusted, so that the load of the spindle becomes with in the maximum load.

(Step SB04) Adjustment guidance, generated based on the determination result in step SB02 and the adjustment amount calculated in step SB03, are displayed using the display 300, in that the adjustment guidance is associated with the block which executes the corresponding machining operation.

Figure 5:
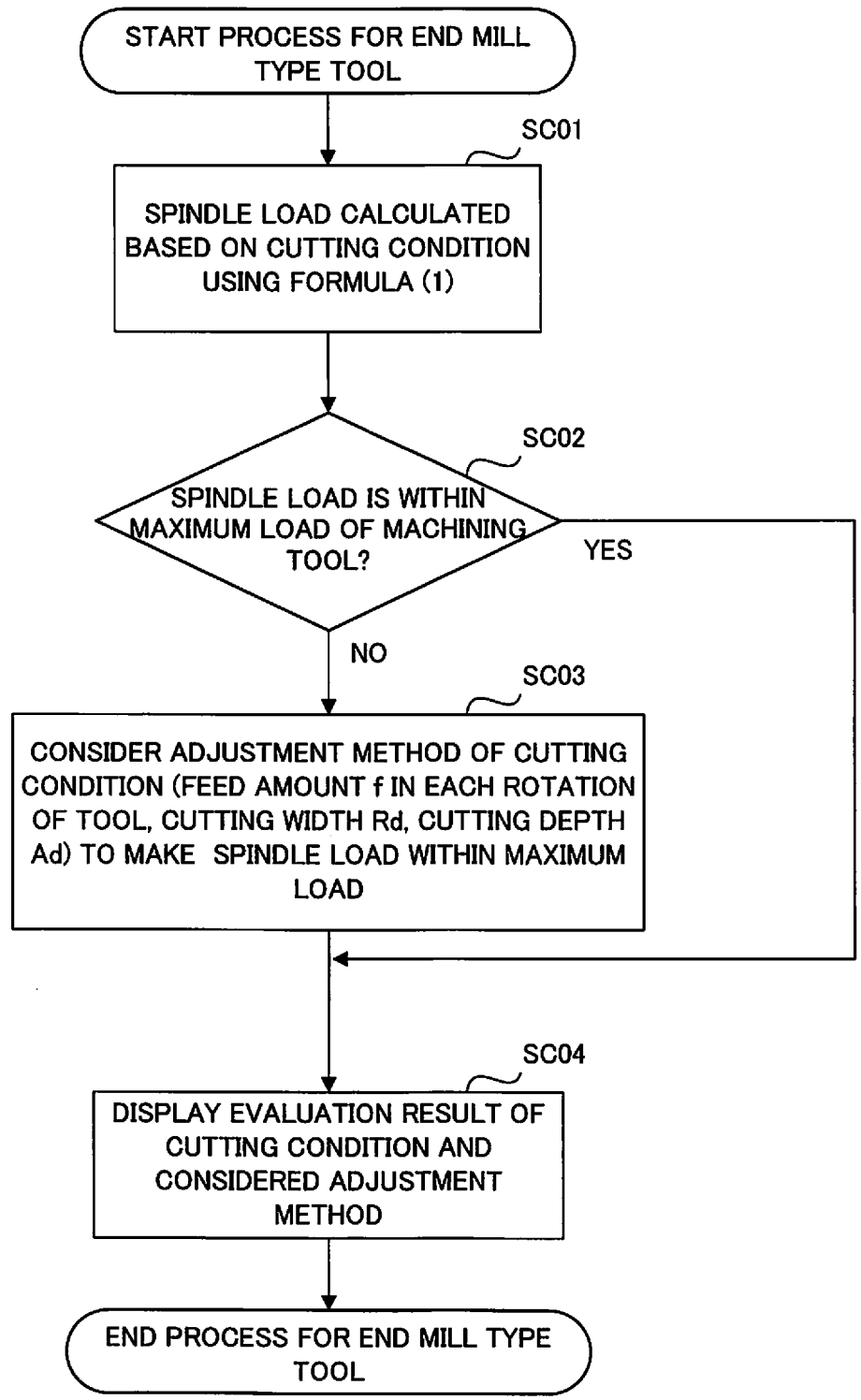
FIG. 5 is a flowchart showing a process for an end mill type tool of one embodiment of the present invention.

FIG. 5 is a flowchart showing a flow of the load calculation process, the load determination process, and the adjustment amount calculation process for the end mill type tool, executed by the machining simulation device 100.

(Step SC01) The load calculation unit 130 calculates the load applied to the spindle by the formula (2), based on the cutting condition read out from the cutting condition storage area 18 and the setup data read out from the setup information storage area 19.

(Step SC02) The load determination unit 140 determines the load applied to the spindle calculated by the load calculation unit 130 in step SC01 is within the maximum load or not. If the load is within the maximum load, the process proceeds to step SC04, and if the load exceeds the maximum load, the process proceeds to step SC03.

(Step SC03) The adjustment amount calculation unit 150 calculates the adjustment amount with which the feed amount f of the feed amount "f" in each rotation of the tool, the cutting width "Rd" in the radius direction, or the cutting depth "Ad" in the axial direction is adjusted, so that the load of the spindle becomes with in the maximum load.

(Step SC04) Adjustment guidance, generated based on the determination result in step SC02 and the adjustment amount calculated in step SC03, are displayed using the display 300, in that the adjustment guidance is associated with the block which executes the corresponding machining operation.

Figure 6:
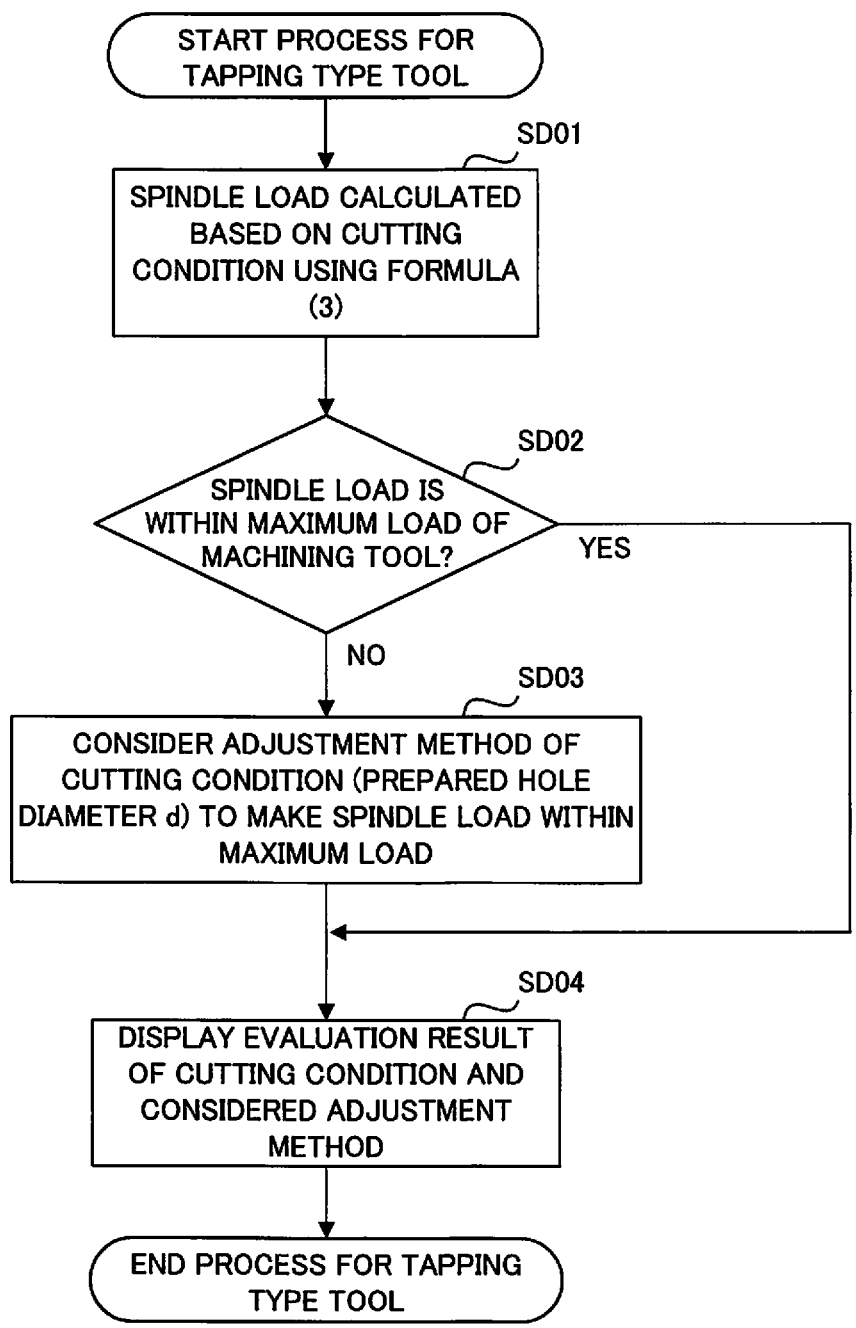
FIG. 6 is a flowchart showing a process for a tapping type tool of one embodiment of the present invention.

FIG. 6 is a flowchart showing a process by a tapping type tool of one embodiment of the present invention.

FIG. 6 is a flowchart showing a flow of the load calculation process, the load determination process, and the adjustment amount calculation process for the tapping type tool, executed by the machining simulation device 100.

(Step SD01) The load calculation unit 130 calculates the load applied to the spindle by the formula (3), based on the cutting condition read out from the cutting condition storage area 18 and the setup data read out from the setup information storage area 19.

(Step SD02) The load determination unit 140 determines the load applied to the spindle calculated by the load calculation unit 130 in step SD01 is within the maximum load or not. If the load is within the maximum load, the process proceeds to step SD04, and if the load exceeds the maximum load, the process proceeds to step SD03.

(Step SD03) The adjustment amount calculation unit 150 calculates the adjustment amount with which the radius "d" of the prepared hole is adjusted, so that the load of the spindle becomes with in the maximum load.

(Step SD04) Adjustment guidance, generated based on the determination result in step SD02 and the adjustment amount calculated in step SD03, are displayed using the display 300, in that the adjustment guidance is associated with the block which executes the corresponding machining operation.

In the embodiments described above, the example in that the cutting condition for the machining operation of the machining program is all read by the storage device or the storage and then used. However, the present invention is not limited to this configuration, and each block corresponding to each machining operation may be configured to be read and simulated.

As for the calculated adjustment amounts, all the adjustment amounts for the adjustment methods may be calculated, associated with the block of the machining program and displayed. Alternatively, the adjustment amount may be calculated and displayed for the adjustment method, designated by an operator before the machining simulation begins.

The invention claimed is:

1. A machining simulation device, comprising:
a processor configured to perform machining simulation based on setup data including workpiece position data and tool data, workpiece data including data of a workpiece type and configuration data, and a machining program, wherein the processor is configured to:
extract a cutting condition in machining based on the machining program, from the machining program,
determine a tool type of a tool to be used in said machining in accordance with the machining program,
calculate, based on the extracted cutting condition and the determined tool type, a spindle load of a spindle of a machining tool, to which the tool is attached, in the machining,
determine whether the calculated spindle load exceeds a predetermined threshold or not, wherein the threshold is determined based on (i) the calculated spindle load and (ii) a rate at which the cutting condition to be adjusted is changed, and
in response to a determination that the calculated spindle load exceeds the predetermined threshold, calculate, in accordance with an adjustment method corresponding to the determined tool type, an adjustment amount with which the cutting condition is adjusted such that the spindle load becomes equal to or less than the predetermined threshold; and
a display configured to display
a result of the determination whether the calculated spindle load exceeds the predetermined threshold, and
an adjustment guidance generated based on the calculated adjustment amount,
wherein the processor is further configured to:
analyze the machining program to obtain a cutting direction of the tool and a spindle direction of the spindle,
determine that the tool type is a drill type tool or a tapping type tool in response to the cutting direction of the tool coinciding with the spindle direction, and
determine that the tool type is an end mill type tool in response to the cutting direction of the tool not coinciding with the spindle direction, and
wherein machining of a workpiece is performed by the machining tool using the tool attached to the spindle of the machining tool, in accordance with the machining program containing an adjusted cutting condition which is the cutting condition adjusted based on the adjustment guidance.

2. A machining simulation device according to claim 1, wherein the processor is further configured to determine the tool type based on a program code of the machining program.

3. A machining simulation device according to claim 1, wherein
the adjustment method corresponding to the determined tool type is such that the processor is configured to calculate
the adjustment amount of a feed amount in each rotation of the tool and a prepared hole diameter in response to a determination that the tool type is a drill type tool,
the adjustment amount of the feed amount in each rotation of the tool, a cutting width and a cutting depth in response to a determination that the tool type is an end mill type tool, and
the adjustment amount of the prepared hole diameter in response to a determination that the tool type is a tapping type tool.

* * * * *